J. H. BEAN.

Tuckers for Sewing-Machines.

No. 5,427. Reissued May 27, 1873.

Attest
Monzo Cannon
John O'Gara

Inventor
Joseph H. Bean
By Wood & Boyd
Attorneys

AM. PHOTO-LITHOGRAPHIC CO. N.Y. (OSBORNE'S PROCESS)

UNITED STATES PATENT OFFICE.

JOSEPH H. BEAN, OF CINCINNATI, OHIO, ASSIGNOR TO FRANCIS W. BROWN, OF SAME PLACE.

IMPROVEMENT IN TUCKERS FOR SEWING-MACHINES.

Specification forming part of Letters Patent No. 132,235, dated October 15, 1872; reissue No. 5,427, dated May 27, 1873; application filed April 11, 1873.

*To all whom it may concern:*

Be it known that I, JOSEPH H. BEAN, of Cincinnati, Ohio, have invented certain Improvements in a new Sewing-Machine Attachment, of which the following is a specification:

This invention consists of an adjustable folding-hook and a gage-plate to be used with a main plate of a tucker so arranged as to hold, fold, and guide the material during the process of stitching primary and secondary tucks; also, in combining and arranging two adjustable folding hook-plates attached and adjusted to the main tucker-plate in such a manner that either part of it may be independently adjusted to make the desired width of tuck and space between the tucks. The hook-plates loosely hold, support, and guide the folded edges of the tuck and cloth, allowing the material to pass evenly and freely through the device. Other features of this invention will be hereinafter fully described.

Figure 1:
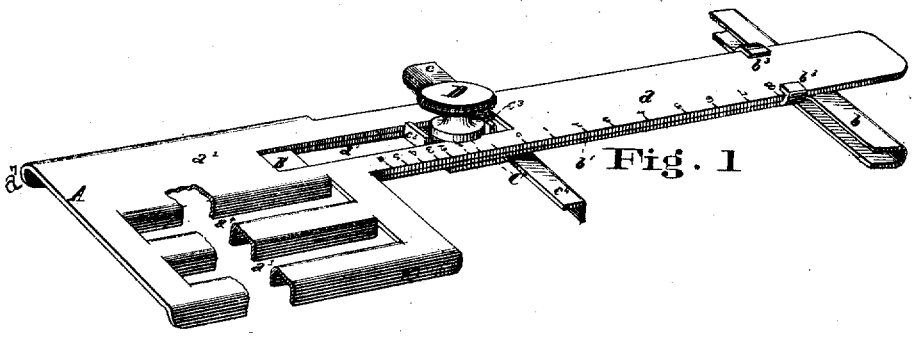
Figure 4:
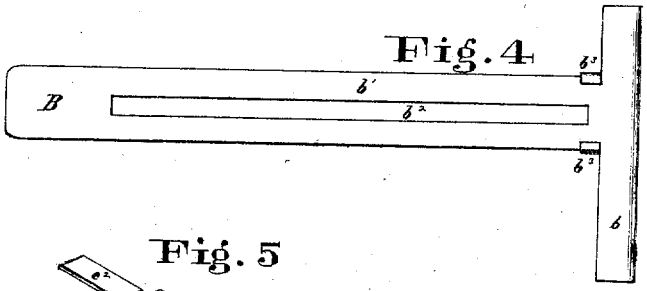
Figure 5:
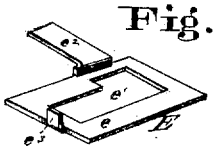
Figure 2:
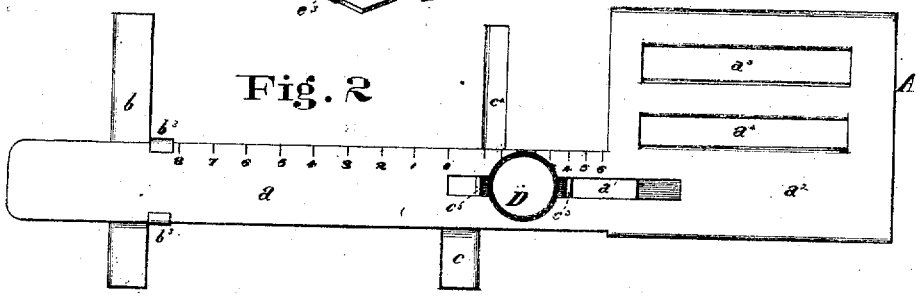
Figure 3:
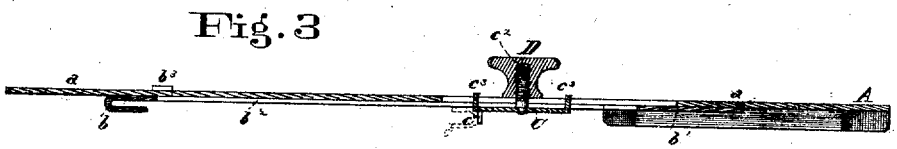
Figure 6:
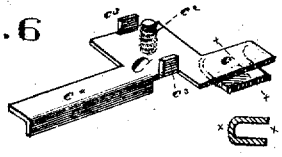

In the drawing, Figure 1 represents a perspective view of my improved tucker and its several parts; Fig. 2, a plan view of the same; Fig. 3, a central vertical section of the same. Fig. 4 represents a plan view of one of the adjustable hook-plates; Fig. 5, a plan view of the shield; Fig. 6, a perspective view of hook C.

A represents the main or attaching plate of the tucker device; *a*, an arm or extension, with a slot, $a^1$. This arm is provided with suitable distance-lines, regularly numbered each way from a line marked O. $a^2$ represents a lateral extension of the plate A, provided with slots $a^3$ and $a^4$, through which a set-screw passes to attach the plate A to the sewing-machine. The slots $a^3$ and $a^4$ are preferably formed by properly cutting the plate and bending the metal downward, forming ledges for the plate to rest upon. These ledges should raise the free or left end of the plate sufficiently high to allow the goods to pass under the hook-plate *b*; $a^7$, similar ledges on the sides of A $a^2$. C represents the folding-hook and gage-plate, which, adjusted from the line of the needle, regulates the width of the tuck; *c*, the folding hook-plate, which extends outward beyond plate A toward the operator; $c^4$, the gage-part, is formed by turning the metal down to form a ledge, $c^5$, corresponding in depth to the hook *c*; $c^3$, guides or lugs working in slot $a^1$, preferably formed by turning up a piece of the plate C. The gages $c^4$ and $c^5$ are used instead of the hook-plate *c*, because, when the gage is set close to the needle the bottom part of the hook would interfere with the feed of the machine. B represents another hook-plate attached to plate A on the opposite side of the line of the needle from plate C. It is provided with an arm, $b^1$, slot $b^2$, which arm and slot are used solely for the purpose of allowing plates B and C to be fastened and adjusted with the same set-screw. *b* represents the hook-plate proper. It is of U-shape, extending across and projecting outward on each side of the plate *a*, as shown, thereby enabling the hook *b* to hold the goods when narrowest plaits are formed, and when the tucker is attached by means of slot $a^3$. The plate C not only serves as a lateral gage, but it also folds or doubles the material as it passes through the machine, dispensing with the marker. It also clasps and loosely holds and guides the folded edge of the material to be stitched, and, by reason of its shape and position, no spring is required to keep the cloth from fulling or in its proper horizontal position. Plate B holds and guides the edge of the completed tuck while a second tuck is being formed; its form, being converse to the edge of the tuck, permits the material to pass through the open edges of the plate easily; and, as the hook-plate *b* prevents the material from fulling, it enables the operator to make narrow or wide tucks evenly. $b^3$ represents catches or lugs securing the plate B to plate A in such a manner that they are free from lateral play, but the one will slide easily back and forth upon the other. $c^2$ represents a threaded pin; D, a set-screw working thereon, and it is used to secure the plates B C in any desired position on plate A. E represents a shield-plate, consisting of the main portion *e*, having slots $e^1$ $e^2$ and guide $e^3$, and is located upon the top-plate A solely, the more effectually to prevent the goods from crowding over the gage; but it is not an essential feature of my invention, and may in most instances be dispensed with.

The manner of using my tucker is as follows: It is secured to the bed-plate of the machine by means of the set-screw, with the mark O on plate A in direct line with the needle. Place the gage *c* just the same distance from O as the desired width of tuck; then adjust the left-hand hook *b* on a line to the left, the number of which corresponds with that at which *c* is placed. If space between the tucks is needed, move the hook *b* to the left just the additional distance of the desired space. To make the first tuck, fold down one edge of the goods to the left, place the folded edge into hook *c*, and stitch the first tuck. To make the second tuck, the forward edge of the goods is folded near the place where it is to be made and placed in the hook *c*. The front end or edge of the completed tuck is then placed in hook *b*, the goods so adjusted that the space between the hooks, &c., is filled, taking care to keep the goods smooth between these hooks when the cloth is in position for stitching. As the stitch is being made, the cloth should be fed into the tucker so as to just fill the space between the hooks *b* and *c;* the latter hook will fold the goods properly when advancing through the device, while hooks *b* and *c* both assist in guiding the goods, as before described. The extension of the hooks beyond the line of the main plate toward the operator is advantageous, because the work is much more easily placed in the tucker than if they were entirely beneath the main plate.

The advantages arising from this construction will be more readily understood, perhaps, if it is considered that in placing the cloth in the tucker a portion of the cloth must be placed in each of the hooks, and a portion must pass under the hook B.

The peculiar construction of the hook-plate C, with its arm $c^4$, instead of a continuation of the hook, enables the device to be used for making the finest tucks. The hook *c* folds down the goods after the front end is started, so that the "doubling down" of the goods by hand the entire length of the tuck before commencing to stitch is dispensed with.

The construction and arrangement of the hook-plates B and C are such as to dispense with spring-arms, markers, &c., whereby many advantages are obtained.

I claim as my invention—

1. The adjustable folding hook-plate C and sliding hook-guide *b*, in combination with the slotted main plate A of the tucker, substantially as herein set forth.

2. The combination of the hook-plates B C with the plate A and set-screw D, the plates B C being both held in place upon the plate A by the screw D, as described.

3. The adjustable plate C having the hook *c* and gage-arm $c^4$ so constructed that the former may be arranged in rear and the latter upon one side of the line of the needle, whereby the narrowest tucks can be made, substantially as described.

4. The combination of the adjustable shield E with the hook-plate C, as described.

5. The tucker described, consisting of the main plate A, hook-plates B C, set-screw D, and shield E, constructed and operating substantially as described.

Witness my hand this 4th day of April, 1873.

JOSEPH H. BEAN.

Attest:
J. H. SMITH,
C. W. EARNIST.